United States Patent
Givens et al.

[11] Patent Number: 5,581,638
[45] Date of Patent: Dec. 3, 1996

[54] METHOD FOR AUTONOMOUS IMAGE REGISTRATION

[75] Inventors: Fenton L. Givens, Dallas; Thomas J. Skinner, Richardson; Paul M. Ingram, Mesquite, all of Tex.

[73] Assignee: E-Systems, Inc., Dallas, Tex.

[21] Appl. No.: 395,633

[22] Filed: Feb. 28, 1995

Related U.S. Application Data

[63] Continuation of Ser. No. 95,543, Jul. 26, 1993, abandoned.

[51] Int. Cl.$^6$ .................... G06K 9/32; G06F 15/336
[52] U.S. Cl. .................... 382/294; 382/151; 382/278; 382/293
[58] Field of Search .................... 382/154, 278, 382/103, 151, 293, 294, 299; 348/51, 263

[56] References Cited

U.S. PATENT DOCUMENTS

| | | | |
|---|---|---|---|
| 3,566,139 | 2/1971 | Hardy et al. | 250/220 |
| 3,655,911 | 4/1972 | Johnston | 178/6.8 |
| 4,444,196 | 4/1984 | Stein | 128/654 |
| 4,641,350 | 2/1987 | Bunn | 382/4 |
| 4,641,352 | 2/1987 | Fenster et al. | 382/6 |
| 4,648,053 | 3/1987 | Fridge | 364/551 |
| 4,685,146 | 8/1987 | Fenster et al. | 382/54 |
| 4,695,959 | 9/1987 | Lees et al. | 364/458 |
| 4,782,361 | 11/1988 | Spinelli et al. | 355/14 R |
| 4,982,081 | 1/1991 | Schmidt | 250/208.2 |
| 5,117,099 | 5/1992 | Schmidt | 250/208.2 |
| 5,119,135 | 6/1992 | Baldwin | 355/218 |
| 5,170,441 | 12/1992 | Mimura et al. | 382/44 |
| 5,181,098 | 1/1993 | Guerin et al. | 358/51 |
| 5,251,271 | 10/1993 | Fling | 382/294 |
| 5,313,570 | 5/1994 | Dermer et al. | 382/25 |

*Primary Examiner*—Leo Boudreau
*Assistant Examiner*—Matthew C. Bella
*Attorney, Agent, or Firm*—Harold E. Meier

[57] ABSTRACT

A method for automatically registering an image pair having a common coverage area, wherein a pair of image data sets, each representing an image of an image pair, are processed to generate initial dewarping coefficients for the image data sets. The translational offset between the images is estimated using a phase correlation process. Next, the common coverage area of the data image sets is determined by finding the vertices defining the limits of the common coverage area. Conjugate point pairs are extracted from the common coverage area by defining a series of block and subblock grids and defining the center point of the grid as a conjugate point location. The determined conjugate point sets are used to generate geometrically corrected registered dewarping coefficients and the image data sets are resampled using the registered dewarping coefficients to generate a registered image pair.

20 Claims, 12 Drawing Sheets

METHOD FOR AUTONOMOUS IMAGE REGISTRATION

This application is a continuation of application Ser. No. 08/095,543, filed on Jul. 26, 1993, now abandoned.

TECHNICAL FIELD

This invention relates to a method for image registration, and more particularly to a method for automatically registering the common coverage area of an image pair.

BACKGROUND OF THE INVENTION

Image registration may be achieved with two classes of image pairings, namely those taken explicitly for stereo applications (stereo pairs), and those pairs with common coverage which were not explicitly taken for stereo applications (common coverage pairs). Stereo pairs usually restrict the resolution of the images to similar values, and limit the convergence, asymmetry and bisection angles. The images of a stereo pair, therefore, have a similar appearance, and are preferred for stereo applications because the stereo effect is more readily perceived.

Images in a common coverage pair may be taken on different occasions, possibly months apart, and may appear significantly different due to changes in lighting, season, ground features, and resolution. Additionally, the convergence and asymmetry angles may be extreme. Common coverage pairs can be used for stereo viewing, but the difference in appearance between images, and extreme convergence and asymmetry angles often make the stereo effect difficult to perceive.

Image registration has many applications for both stereo and common coverage pairs. The stereoscopic effect is used in three-dimensional mensuration and mapping, charting and geodesy (MC&G) applications to extract three-dimensional measurements not obtainable from monoscopic images. Image registrations are also used in other MC&G applications, such as terrain elevation extraction, in which automated algorithms perform search strategies in spaces constructed from registered images.

The use of image registration and common coverage pairs also arises in general search applications. In general search applications, two images are registered for comparison as a "reference" and a "mission" image. Image registration is also used for the automatic location of fixed targets. Given the coordinates of fixed target in a "reference" image, the target can be located to within a few pixels automatically in a "mission" image if the two images are registered. In comparison, alternative methods based only on camera pointing information from the "mission" image can give errors of thousands of pixels.

Given a pair of images with common ground coverage, it is extremely difficult to view them in stereo without a registration process. It may be possible to view them simultaneously as monoscopic images, but image manipulations presently available rarely enable stereo perception. Even when stereo perception is possible, any measurement made from such a set-up will be inaccurate, the images will have to be readjusted if the field of view is moved, and the stereo effect will only be perceptible for short periods of time, after which eye strain will make further viewing intolerable.

The reason for these problems is the lack of geometry common to both images. When the two images of a stereo pair are taken, the orientations of the camera during the scanning or framing process are almost unconstrained with respect to each other and instead are constrained with respect to the target. Certain scanning or framing parameters may be restricted for a stereo pair, but this is generally not enough to allow stereo perception of the raw data images. The situation is even worse for common coverage pairs, for which relative camera orientations are completely unrelated.

Presently existing solutions for the image registration problem have not created the capability to perform image registration autonomously. In present systems, an operator must extract conjugate points by hand. In the hard copy (film) world, this involves the use of a comparator that typically requires five to twenty minutes per stereo pair. However, these results are usually inaccurate and the images will not stay registered everywhere, but will typically drift out of registration during normal translational viewing of the image. The effect may be compensated for by manual adjustment, but adjustments are based on the perception of the stereo effect, rather than accurate measurement and results in degradation of the mensuration accuracy.

In the soft copy (computer data images) world, total registration is possible if a dewarping capability is available. Stereo dewarping takes the natural approach to image registration, by resampling the images to a common scanner or framing geometry. Theoretically, this method should present the images on a computer screen in a way that satisfies human requirements for stereo perception, based upon calculations using sensor flight and altitude data. In practice, however, stereo dewarping usually fails to register the images, because sensor flight and altitude data contains significant pointing and scan rate errors. Pointing errors usually contribute the largest misregistration effect and appear as an offset between the two images. Scan rate errors contribute additional misregistration by causing the images to drift out of registration during translation after the offset has been removed.

Thus, a need has arisen for an image registration system that will automatically register a common coverage pair or stereo image pair for use with a variety of image registration applications.

SUMMARY OF THE INVENTION

The present invention overcomes the foregoing and other problems with a method for autonomous image registration. This method automates the manual soft copy registration procedure presently in existence. The process begins with an initial dewarping step that generates the initial dewarping polynomial coefficients based on the position, altitude, velocity, etc., of the sensor platform. These dewarping polynomials approximately register the images in the sense that the resampled images appear at the same scale but rotated so that the epipolar line is almost horizontal.

The next step of the procedure estimates the translational offset between the image pair data sets. This is accomplished by computing the offset between the images by matching subsets of the resampled image data sets. The matching process is based on phase correlation of the image data sets to create a shift factor indicating the translation offset between the images and a Figure-Of-Merit that measures the degree of correlation between the offset images.

Once the offset between the images is estimated, the limits of common coverage for the image data sets are computed by determining the vertices of the common coverage area using a boundary tracking process. After the common coverage area is found, the data sets are resampled at a greatly reduced resolution such that the common coverage area just fits within the data sets.

Next, conjugate points for the image are extracted from the common coverage area in two steps. The first step computes initial estimates for the conjugate points. This is accomplished by phase correlation matching of grid windows superimposed on the resampled image data sets. The parallax for these conjugate points represent the average parallax between conjugate points over the large ground area represented by the grid windows. These initial points are refined by iterative registration which performs phase correlation matching within smaller subwindows at increased magnification. The parallax for these conjugate points represents the average parallax over smaller windows on the ground and are consequently more accurate than previous estimates.

Finally, the process of the present invention constructs the registered dewarping coefficients by applying a geometric correction algorithm to the final set of conjugate points from the previous step. The geometric correction algorithm computes the registered dewarping polynomials as affine perturbations of the initial dewarping polynomials, whose translational part removes pointing error misregistration, and whose linear part removes residual scan rate error misregistration. The registered dewarping coefficients are then used to resample and save a registered image pair.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
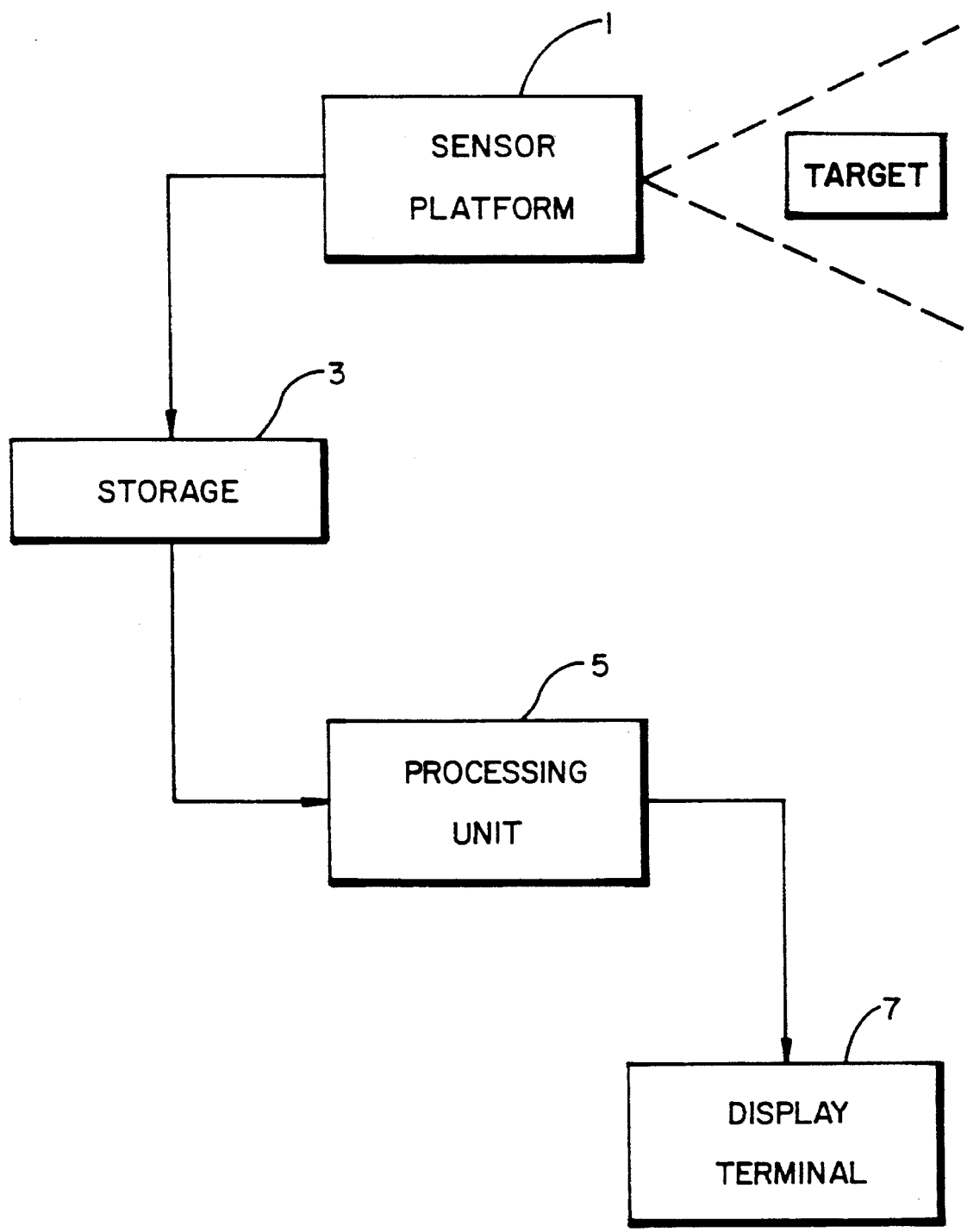
FIG. 1 is a block diagram of one embodiment of a system platform using the autonomous image registration system of the present invention.

Referring now to the drawings, and more particularly to FIG. 1, there is illustrated a block diagram of one embodiment of a system platform utilizing the method for autonomous image registration. A sensor platform 1 detects and records the target images which will ultimately be compared for registration purposes. The sensor platform 1 may consist of a sensor pair (not shown) or a single sensor (not shown) taking multiple readings of a target image from various perspectives. The image data recorded by the sensor platform 1 is stored as image data sets within a storage area 3 along with geolocation information generated by the sensor platform 1.

A processing unit 5 performs the image registration procedures on image data sets retrieved from the storage area 3. Image data sets are sent to the processing unit 5 in pairs representing a left data image set and a right data image set. The data image sets are processed utilizing a method which will be more fully discussed with respect to the following drawings.

Once the image registration process has been completed by the processing unit 5, a stereoscopic image of the target object is output to a display unit 7 for viewing. The display unit 7 provides a user with a three dimensional view of overlapping portions of the data image sets originally presented to the processing unit 5. The stereoscopic image may then be used in a variety of applications.

Figure 2:
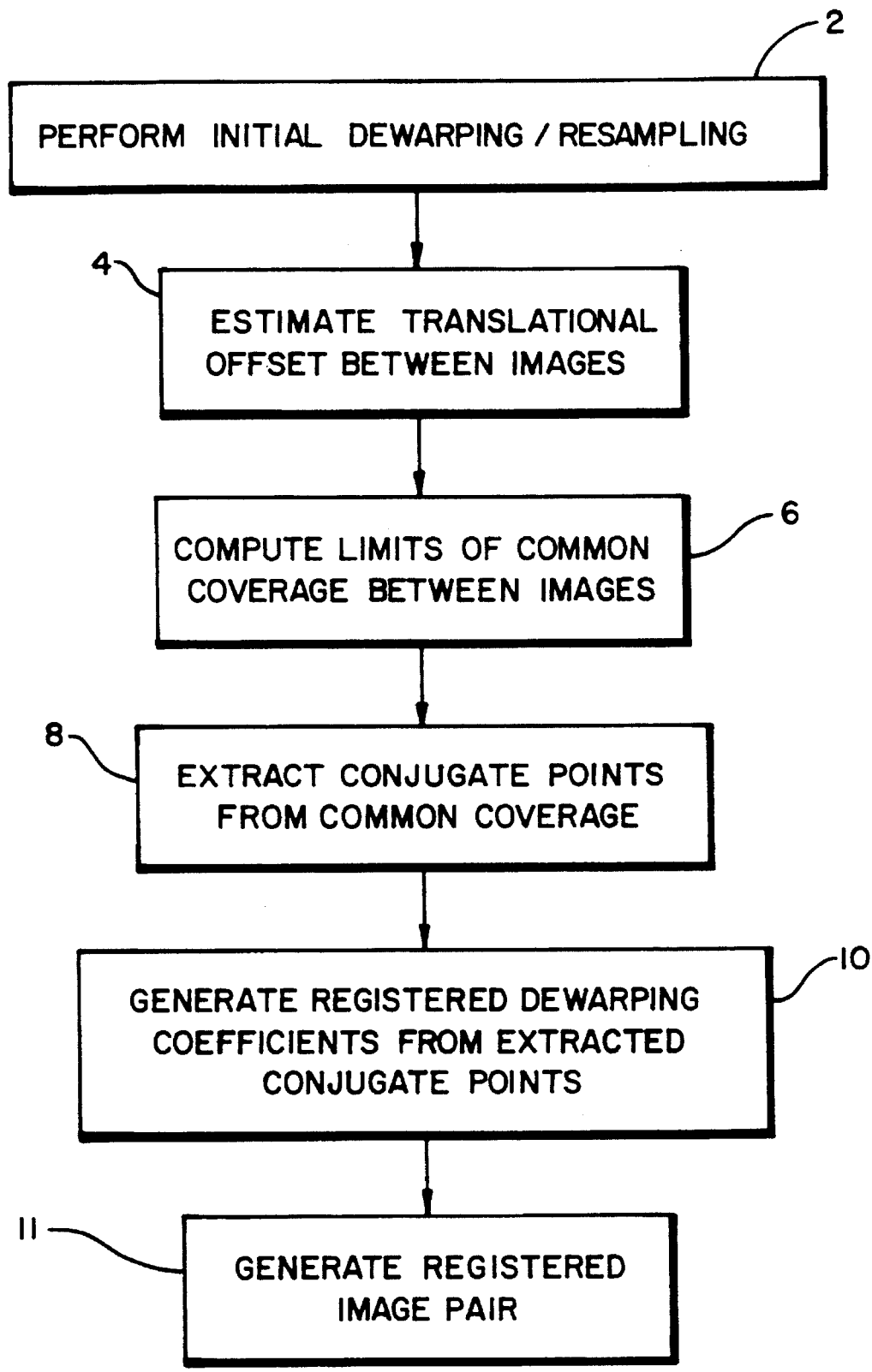
FIG. 2 is a flow diagram illustrating at a top level the method of the present invention.

Referring now to FIG. 2, there is illustrated a top level flow diagram of the method for autonomous image registration performed within the processing unit 5. The details of each block will be more fully discussed with respect to the other figures. An initial dewarping process generates at step 2 the dewarping polynomial coefficients for the images based upon parameters relating to the position, altitude, velocity, etc., of the sensor platform 1 as measured by a Global Positioning System (GPS), Inertial Navigational System (INS) or other similar navigational system. The generated dewarping polynomial coefficients approximately register the images by resampling the images at the same scale in a common dewarping coordinate system and rotating the images so that the epipolar line of each image is almost horizontal and most known program motion distortions are removed.

An estimation of the translational offset between the images is made at step 4 by matching data subsets of the resampled data sets from each image. The matching process is based on phase correlation, where the phase correlation of two data subsets is the inverse Fourier transform of the phase of the cross power spectrum of the subsets. The degree of correlation is measured by a correlator Figure-Of-Merit (FOM), defined as the difference between the maximum correlation in the signal region and the maximum correlation in the noise region.

After estimating the translational offset between images, the limits of common coverage between the images are computed at step 6 using a boundary tracking function, which expresses the extent of the common coverage area as a list of vertices. Once determined, the data sets within the common coverage area are resampled at greatly reduced resolution creating an image data set pair encompassing only the common coverage area.

The extraction, at step 8, of conjugate points in the common coverage area proceeds in two steps. First, initial estimates for the conjugate points are computed from the data sets generated at step 6. This is accomplished by phase correlation matching of data subsets in a grid of common coverage blocks overlaying both of the resampled data sets. The parallax for the conjugate points represents the average parallax between conjugate point pairs over the ground area within the blocks. These initial points are further refined by iterative registration that performs phase correlation matching in smaller subblocks within the common coverage blocks at each iteration. The parallax for these conjugate points represents the average parallax over smaller areas of the covered area and are more accurate than the preceding conjugate point estimations. The process actually performs phase correlation matching blocks of fixed size in data sets of increasing resolution. The registered dewarping coefficients are generated at step 10 from the conjugate points extracted at step 8 by applying a geometric correction algorithm to the conjugate points generated at step 6. Finally, a registered image pair is generated at step 11 from the resampled registered dewarping coefficients. The registered pair is used to present the stereoscopic image at the display terminal 7 (FIG. 1).

Figure 3:
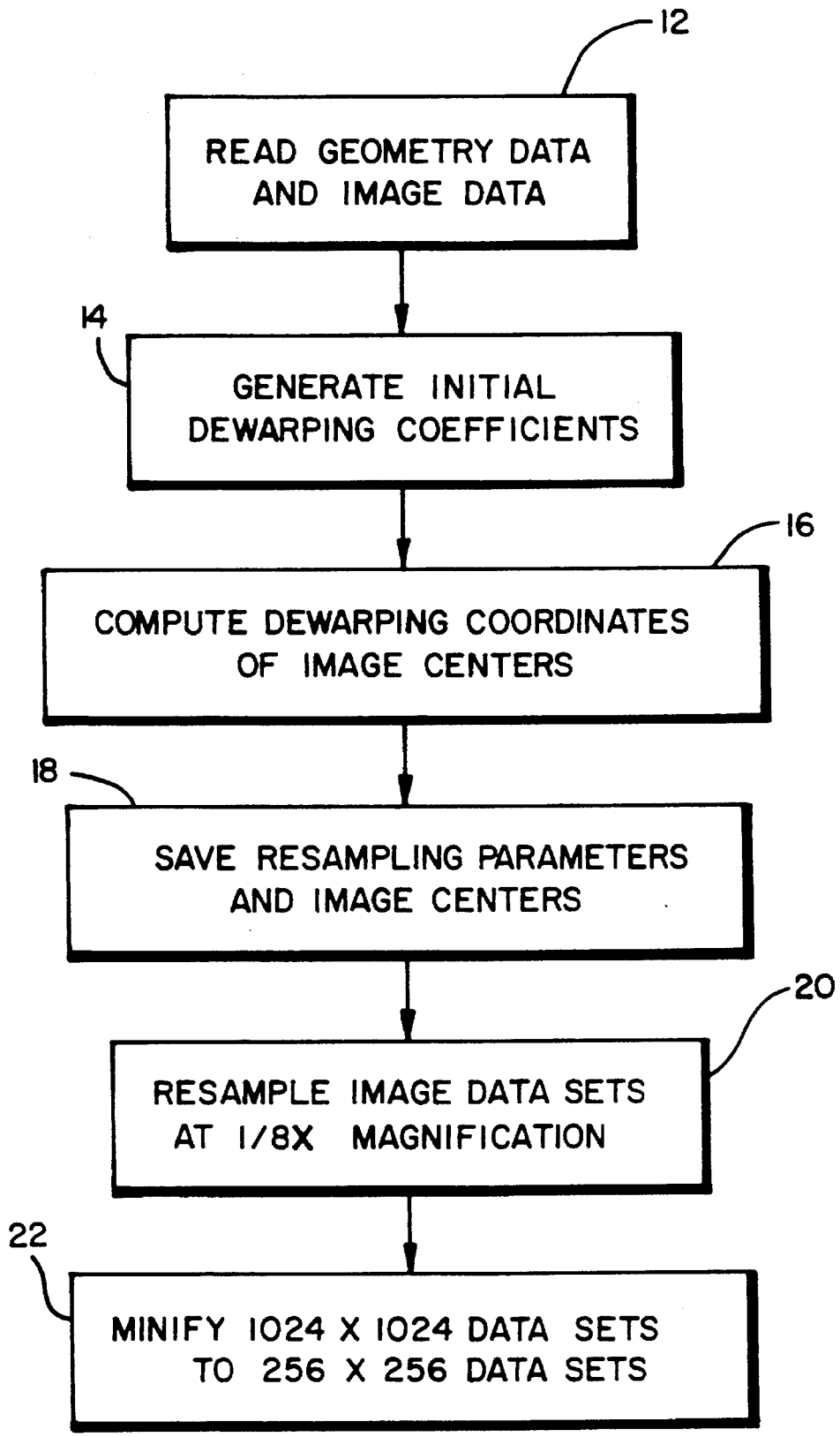
FIG. 3 is a flow diagram illustrating the method for determining initial dewarping and resampling coefficients.

Referring now to FIG. 3, there is illustrated a flow diagram of the initial dewarping and resampling process of step 2. At step 12, the geometry data, relating to position, altitude, velocity, etc., from the GPS, INS or other positioning system and the image data from the left and right image data sets is read. This data is used to generate at step 14 the initial dewarping coefficients. This is accomplished by dewarping the images into a common ground plane tangent to the earth at a mid-point between the two images. The dewarping process generates a set of dewarping coefficients for each image in the (r, s) stereo dewarping coordinate system of the ground plane. The images are resampled in the stereo dewarping coordinate system at the same scale and rotated such that the epipolar line is substantially horizontal to the ground plane.

After the generation of initial dewarping coefficients, the dewarping coordinates of the centers of the two resampled images $(r_c, s_c)$ are computed at step 16. The center of an image in dewarped space is determined to be the barycenter of the four corners of the image. The generated dewarping coefficients and computed image centers are saved at step 18.

Next, the left and right images in dewarped space centered at $(r_c, s_c)$ are resampled at step 20 at ⅛X magnification to produce intermediate resampled data sets of size 1K by 1K. The resampled data sets are then minified using a Reduced Resolution Data Set (RRDS) generation function to yield a pair of 256 by 256 resampled image data sets. Each image data set is centered on the middle of the image and contains data describing substantially the entire common coverage area at a magnification of ¹⁄₃₂X.

Figure 4:
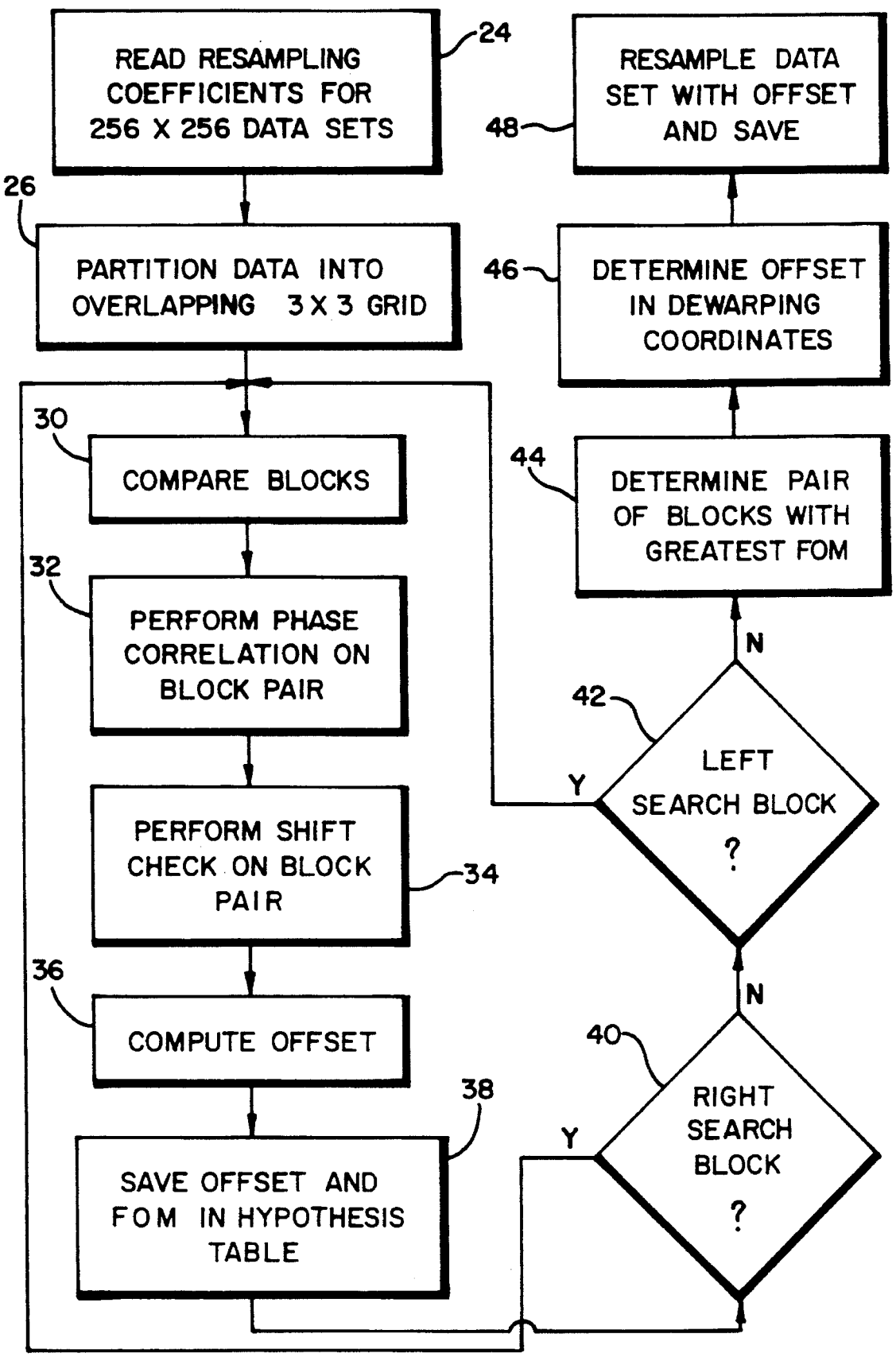
FIG. 4 is a flow diagram illustrating the method for determining the translational offset between images.
Figure 5:
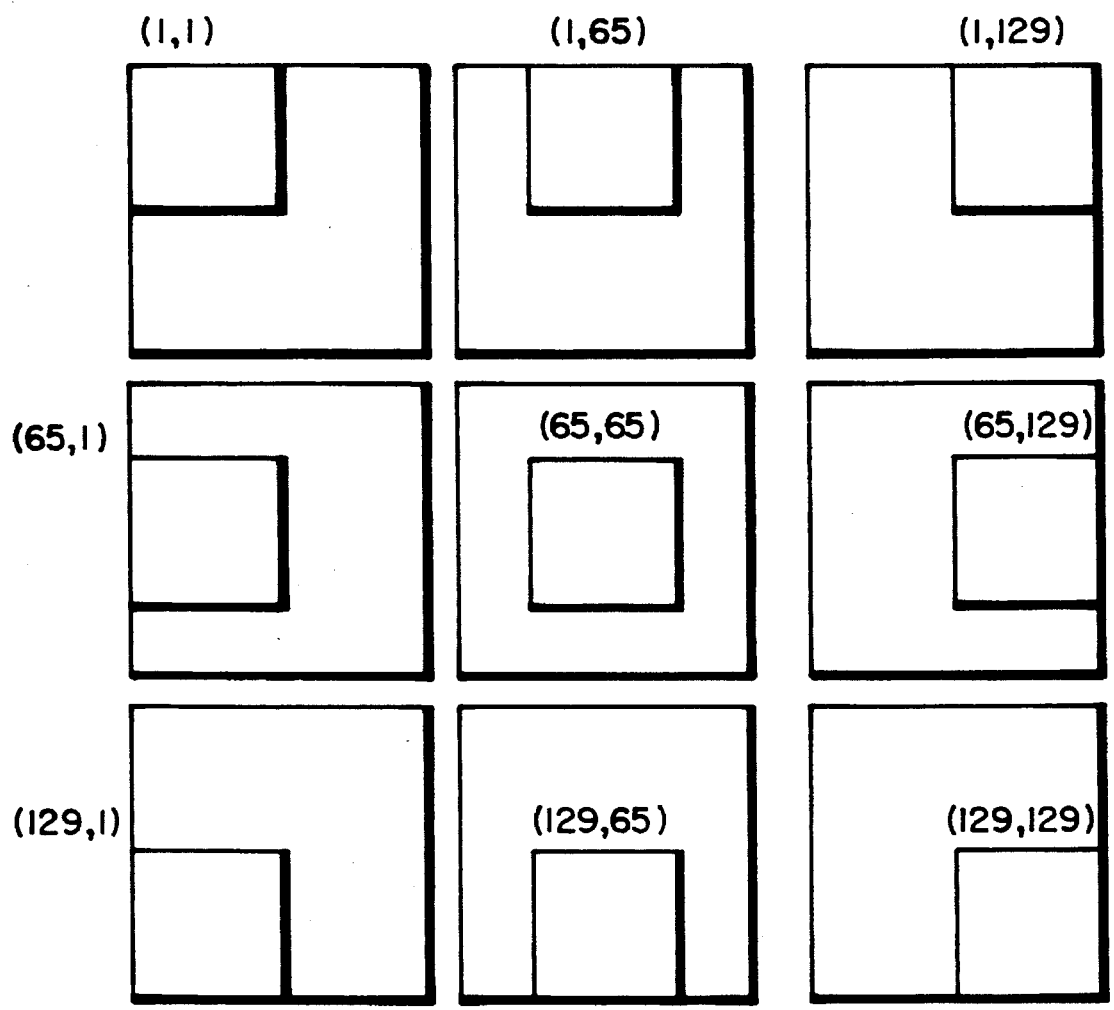
FIG. 5 illustrates the common coverage block grid overlaying a 512 by 512 data set.

Referring now to FIG. 4, there is flow diagram illustrating the process for estimating the translational offset between the images of step 4. This process estimates the translational offset between the resampled images arising from pointing error between platform sensors. The process simulates the manual process of superimposing the left and right images and shifting them against each other without rotation until image features in the overlap region coincide. The image data used in this process are the 256 by 256 resampled left and right image data sets generated in the dewarping process of FIG. 3. Initially, all of the data points are read at step 24 from the 256 by 256 data sets generated by the dewarping process. Both of the 256 by 256 resampled image data sets are partitioned at step 26 into a symmetric 3 by 3 grid of nine (9) overlapping 128 by 128 blocks, as shown in FIG. 5. The point pairs above each diagram in FIG. 5 indicates the starting point of the upper left-hand corner of each of the overlapping blocks.

The data points within the first search block from the left image data set are compared to the data points within the first search block in the right image data set at step 30. Phase correlations are performed at step 32 on the block pair to determine the translational offset vector between the image pair. The phase correlation of the blocks gives a first estimate of the residual shift $(u_{shift}, v_{shift})$ required to align the blocks and a Figure-Of-Merit (FOM) indicating how well the blocks match. The discrete translation and the residual translations determined above are combined to give an estimate $(p_{shift}, q_{shift})$ vector of the translational offset between the image data sets in accordance with the following expression:

$$(p_{shift}, q_{shift}) = (p_r - p_l + u_{shift}, q_r - q_l + v_{shift}) \tag{1}$$

where: $p_r$=p coordinate of right image data point, $p_l$=p coordinate of left image data point, $u_{shift}$=u coordinate of residual shift vector, $q_r$=q coordinate of right image data point, $q_l$=q coordinate of left image data point, and $v_{shift}$=v coordinate of residual shift vector.

A shift check procedure uses the $(p_{shift}, q_{shift})$ vector to again phase correlate at step 34 the block pair taking into account the translational offset vector determined above. This allows the computation of a new value of the translational offset $(p_{shift}, q_{shift})$ vector at step 36 and this new translational offset vector and its corresponding FOM are stored at step 38 in a hypothesis table.

Inquiry step 40 determines if another search block exists within the right image data set and returns to step 30 to compute the translational offset vector and Figure-Of-Merit between each of the nine (9) search blocks (see FIG. 5) in the right image data set and the search block in the left image data set. After the first search block in the left image data set has been compared to each search block in the right image data set, inquiry step 42 determines if another search block exists within the left image data set, and if so, passes control to step 30 to compare this block with each of the search blocks in the right image data image set.

This procedure creates a hypothesis table having 81 entries wherein each search block in the left image data set is compared to each search block in the right image data set and a translational offset and Figure-Of-Merit are created in response to each comparison. The search block pair having the greatest Figure-Of-Merit is determined and saved at step 44. The offset between images expressed in dewarping coordinates $(r_{shift}, s_{shift})$ is computed at step 46 using the translational offset vector of the block pair having the greatest Figure-Of-Merit according to the following equation:

$$(r_{shift}, s_{shift}) = \left( r_r - r_1 + \frac{p_{shift}}{mag}, s_r - s_1 + \frac{q_{shift}}{mag} \right) \tag{2}$$

The output of this equation is an estimate $(r_{shift}, s_{shift})$ in initial dewarping coordinates of the offset between images. The image data sets are then resampled with the right image data set offset by $(r_{shift}, s_{shift})$ to compensate for translational offset and stored at step 48.

Figure 6:
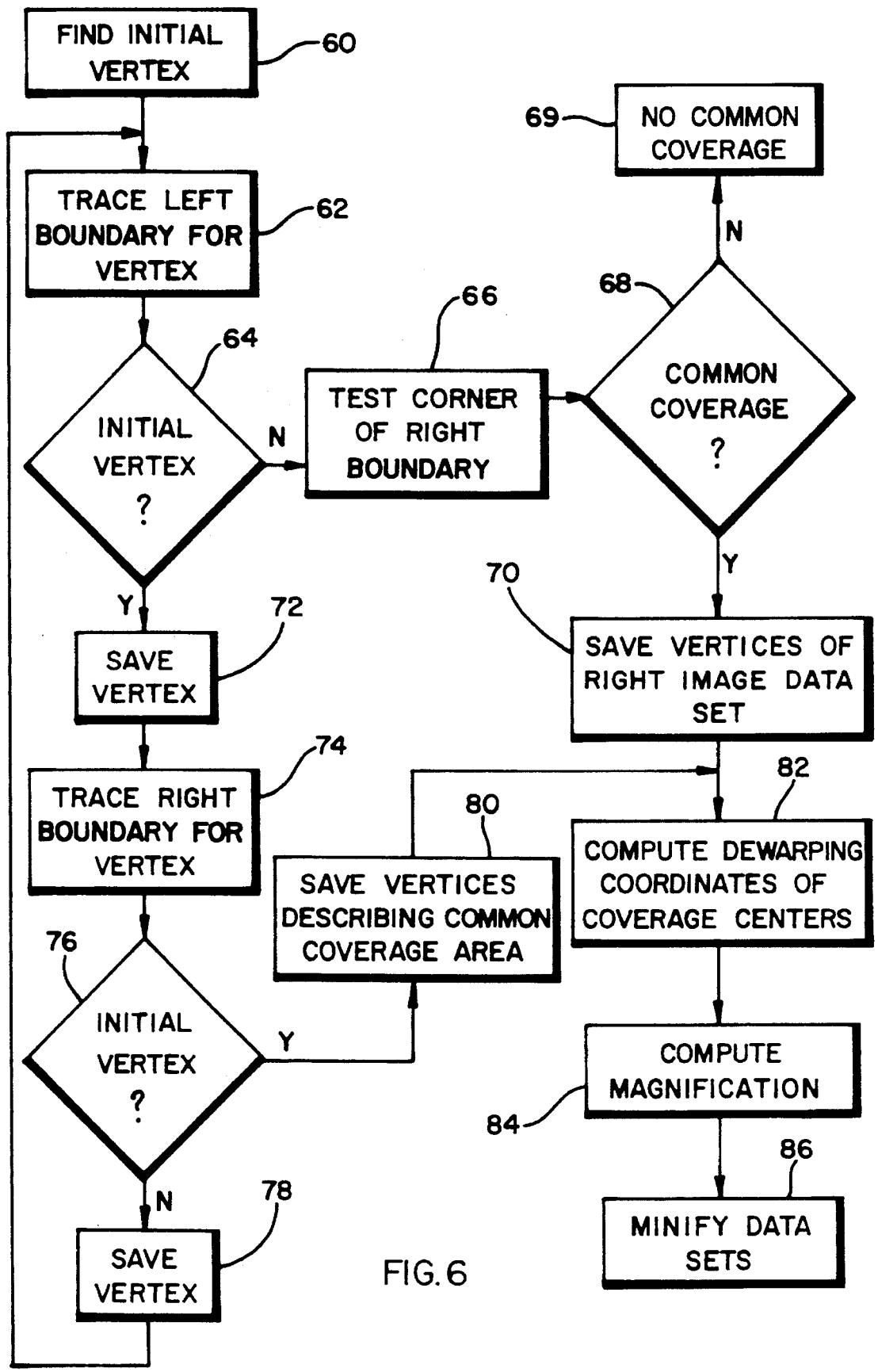
FIG. 6 is a flow diagram illustrating the method for determining the common coverage areas between the image data sets.

Referring now to FIG. 6, there is illustrated the method for determining the common coverage area of the left and right image data sets of step 6. The extent of the coverage is expressed as a list of vertices, which are derived by tracing around the image boundaries and testing for points common to both data sets. The vertex list is used to calculate in dewarp space the centers of coverage and the dimensions of the smallest square circumscribing the common coverage area and oriented along the dewarping coordinate axes. These squares contain the entire common coverage area and are used for determining the initial conjugate points.

The initial vertex point is found at step 60 by starting at the lower left-hand corner of the left image data set, tracing clockwise around the boundary of the data set and determining whether each boundary point is contained within common coverage. Whether a particular boundary point is contained within the common coverage of the data sets is determined according to the equation:

$$(p_r, q_r) = F_r[F_l^{-1}(p_l, q_l) + (r_{shift}, s_{shift})] \quad (3)$$

where: $F_l$=left array in dewarp space $F_r$=right array in dewarp space $(p_l, q_l)$=point in left array $(p_r, q_r)$=point in right array By solving the above equation, a determination is made at step 60 as to whether the chosen boundary point resides within the left and right image data sets. Once the initial vertex is determined, the method continues to trace along the boundary of the left image data set for a second vertex point at step 62. The second vertex point will be the boundary point immediately preceding a point which leaves the common coverage area of the left and right image data sets as determined by equation 3.

A determination at step 64 inquires whether the vertex point found at step 62 corresponds to the initial vertex point found at step 60. If so, then there is either no common coverage area between the left and right image data sets or the right image data set resides completely within the left image data set. This determination is made beginning at step 66 wherein the lower left-hand corner of the right image data set is tested according to equation (3). This determines if the vertex lies within the common coverage area at step 68. If the right image data set does not reside within the left image data set, the procedure stops at step 69 because no common coverage exists between the left and right image data sets and autonomous registration is not possible. If the right boundary point exists within the common coverage area, the right image is completely contained within the left image and the vertices of the right image data set are stored at step 70, as the vertices of the common coverage area.

If inquiry step 64 determines the new vertex is not the initial vertex, the new vertex is saved at step 72. The process then switches from tracing along the left image boundary to tracing at step 74 along the right image boundary until an additional vertex point is discovered. The next vertex point is found in the same manner as discussed in step 62. Inquiry step 76 determines if a newly discovered vertex point corresponds to the initial vertex. If not, the vertex point is saved at step 78 and control returns to step 62 to follow along the left boundary of the vertex. When the initial vertex point is located at step 76, the vertices describing the common coverage area are saved at step 80.

Having found the list of common coverage vertices, a pair of 512 by 512 resampled minified data sets may now be generated using a RRDS function. These data sets contain the entire common coverage area, have the translational offset nearly removed, and are used for finding the initial estimates of conjugate point locations. This is accomplished by computing at step 82 the dewarping coordinates ($r^{center}_r$, $s^{center}_r$) and ($r^{center}_l$, $s^{center}_l$) of the coverage centers in the left and right images and calculating at step 84 the magnification required to fit the common coverage area into 512 by 512 data sets. The coverage centers are determined according to the following equations:

$$r_1^{center} = \frac{r_1^{max} + r_1^{min}}{2} \quad (5)$$

$$s_1^{center} = \frac{s_1^{max} + s_1^{min}}{2} \quad (6)$$

$$(r_r^{center}, s_r^{center}) = (r_l^{center} + r_{shift}, s_l^{center} + s_{shift}) \quad (7)$$

These equations give the coordinates of the center of coverage in the left and right image data sets.

The magnification value is computed by dividing the data set size, in this case 512, by the common coverage size as follows:

$$\text{Magnification} = \frac{\text{data set size}}{\text{common coverage size}} \quad (8)$$

where: data set size=512; and coverage size=maximum $[r_l^{max} - r_l^{min}, s_l^{max} - s_l^{min}]$ The 1024 by 1024 data sets are then resampled at step 86 and minified using a RRDS function at step 86 to 512 by 512 data sets encompassing the common coverage area.

Figure 7A:
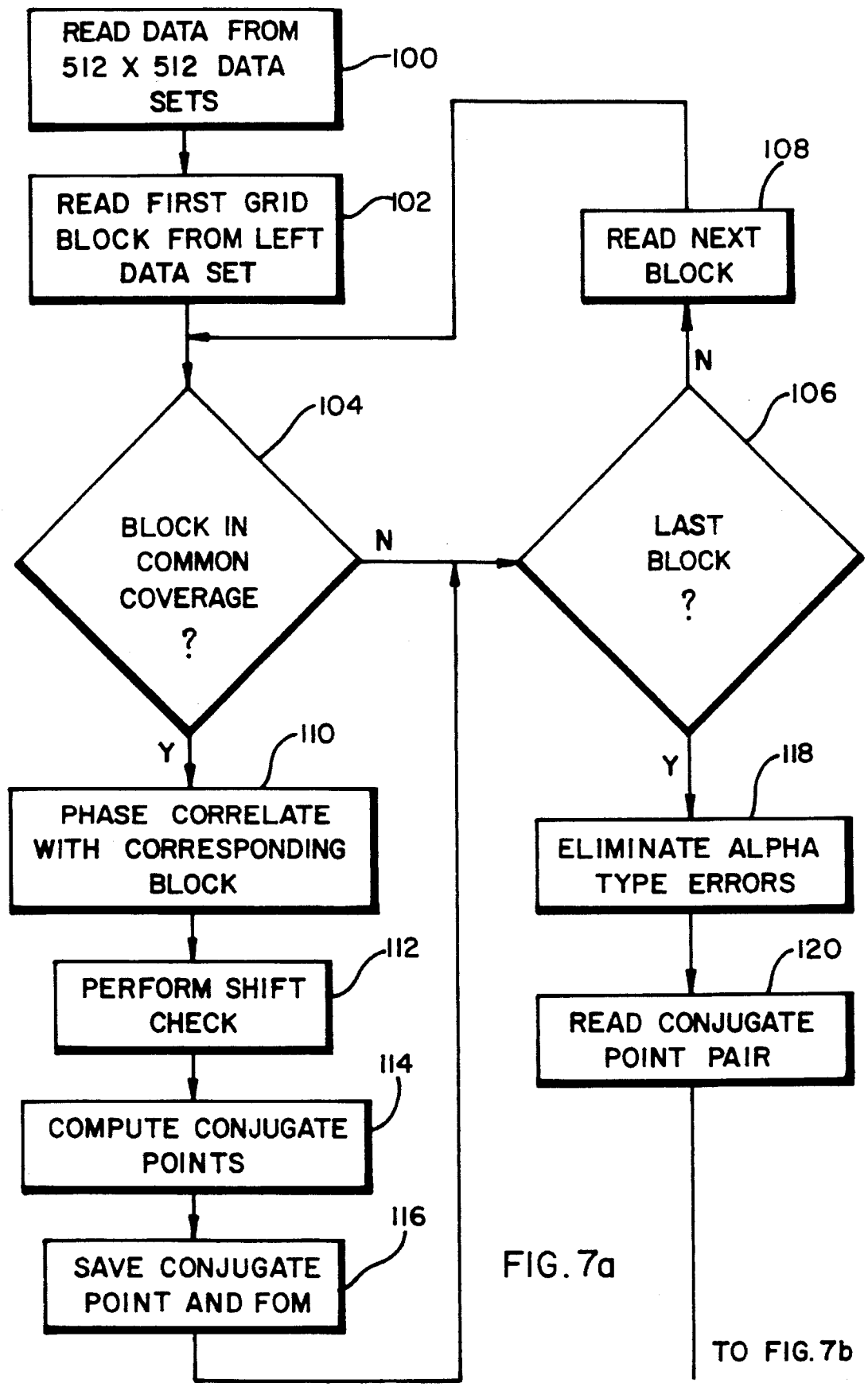
FIGS. 7a and 7b is a flow diagram illustrating the method for determining the initial conjugate point estimates.
Figure 7B:
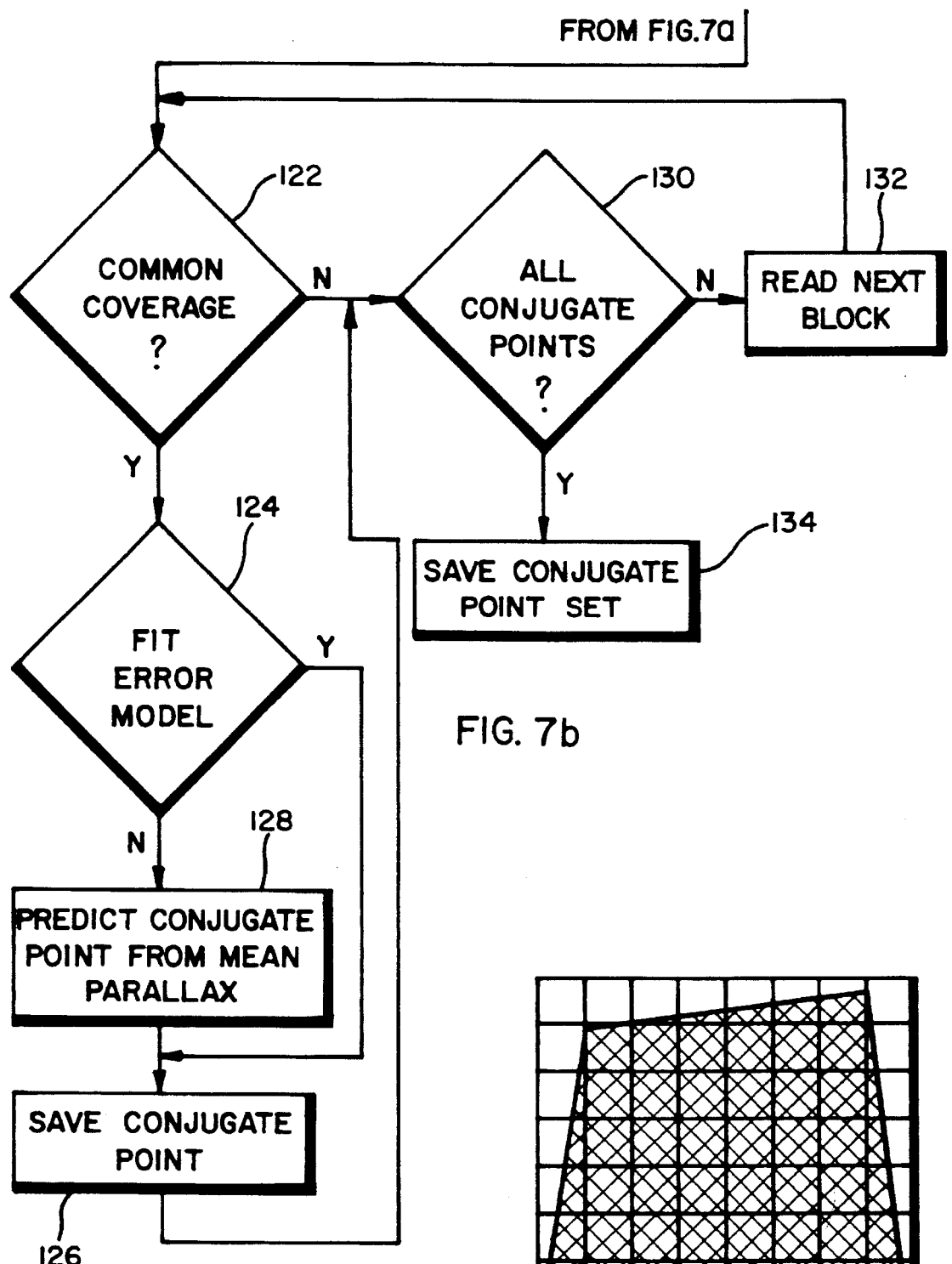
Figure 8:
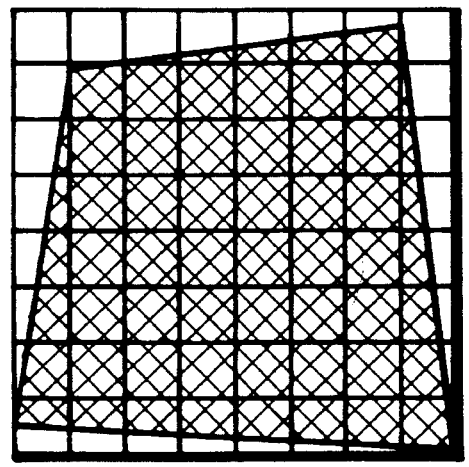
FIG. 8 illustrates the common coverage block grid overlaying the common coverage area.

Referring now to FIGS. 7a and 7b, there is illustrated a flow diagram showing the process of step 8 and step 10 for determining an initial estimation for the conjugate point pairs within the common coverage area. This process attempts to generate a uniformly distributed set of conjugate points by overlaying a grid of common coverage blocks over the common coverage area and finding a conjugate point within each common coverage block as illustrated in FIG. 8. Throughout the extraction process, each conjugate point pair is found by first finding a pair of matching blocks from the left and right image data sets and then defining the conjugate points to be the center data points of the matching blocks.

First, at step 100, the data from the 512 by 512 data sets are read. The data contained within the first common coverage block of the left image data set is read at step 102. At inquiry step 104, a determination is made if the block is completely contained within the common coverage area. For blocks not completely within the common coverage area, inquiry step 106 determines if the block is the last block covering the left image data set. If other blocks exist, the next block is read at step 108. This block is analyzed as previously discussed at step 104. Otherwise, control passes to step 118.

If a block is contained within the common coverage area, the common coverage block and the corresponding block in the right image data set are phase correlated at step 110 to determine an initial shift vector and Figure-Of-Merit for the blocks as previously described. A shift check is performed at step 112 to phase correlate the block pair taking into account the initial shift vector estimate. This procedure generates a final shift vector value and FOM in dewarping coordinates. The conjugate points for the blocks are calculated at step 114 by computing the coordinates of the center point of the left image data set and then determining the coordinates of the center points of the right image data set by adding the shift vector for the block to the center point of the left image data set. The conjugate point pair and the Figure-Of-Merit are saved at step 116 for the block pair being analyzed.

Control returns to step 106 to determine if the analyzed block was the last common coverage block within the overlapping grid. If not, the next block is read at step 108 and analysis continues. Once all blocks have been analyzed, error correction analysis initiates at step 118.

Alpha type errors are eliminated at step 118 from the determined conjugate point set. Alpha type errors arise from block pairs that should have successfully registered but failed to register for some reason. One method for eliminating Alpha-type errors comprises finding the conjugate point within a conjugate point set that when eliminated minimizes the standard deviation of the horizontal parallax ($r^\sigma$) below a predetermined maximum value of $r^\sigma$. If the removal of a single conjugate point is not enough to lower the standard deviation of the horizontal parallax below the maximum level, additional points may be removed as necessary.

The conjugate point pair for the first common coverage block pair is read at step 120. Inquiry step 122 determines if a conjugate point pair was successfully generated for the block pair indicating whether or not the block was completely contained in the common coverage area. The conjugate point pair is compared to an error model at step 124 to determine if the point fits the error model. A conjugate point pair fits the error model if the FOM of the correlated block pair containing the conjugate points exceeds a predetermined minimum value.

If the conjugate point pair fits within the error model, the pair is saved as an initial conjugate point pair at step 126. If the pair does not fit the error model, the mean parallax ($r^u$, $s^u$) of the conjugate point set is used to predict at step 128 the conjugate points as follows:

$$r_l^{conjugate}(i,j) = r_l^{center}(i,j)$$

$$s_l^{conjugate}(i,j) = s_l^{center}(i,j)$$

$$R_r^{conjugate}(i,j) = r_r^{center}(i,j) + r^u$$

$$s_r^{conjugate}(i,j) = s_r^{center}(i,j) + s^u$$

The predicted conjugate points are saved at step 126.

Inquiry step 130 determines if all of the conjugate point pairs for each common coverage block have been compared to the error model. If not, the next conjugate point pair is read at step 132 and compared to the error model. Once the final conjugate point pairs are analyzed, the entire initial conjugate point set is saved at step 134.

Figure 9A:
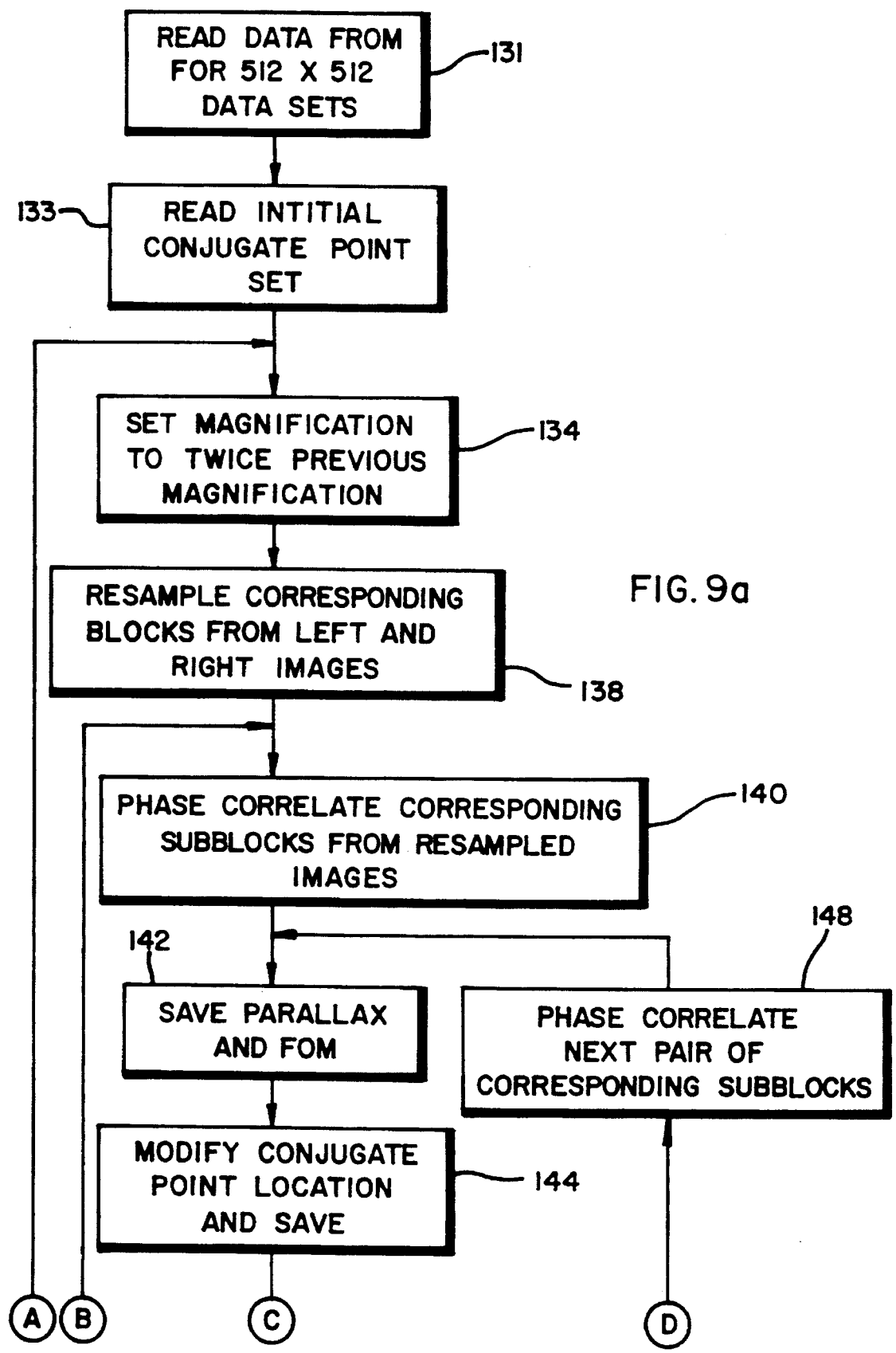
FIGS. 9a, 9b and 9c are flow diagrams illustrating the method for refining the initial conjugate point estimates.
Figure 9B:
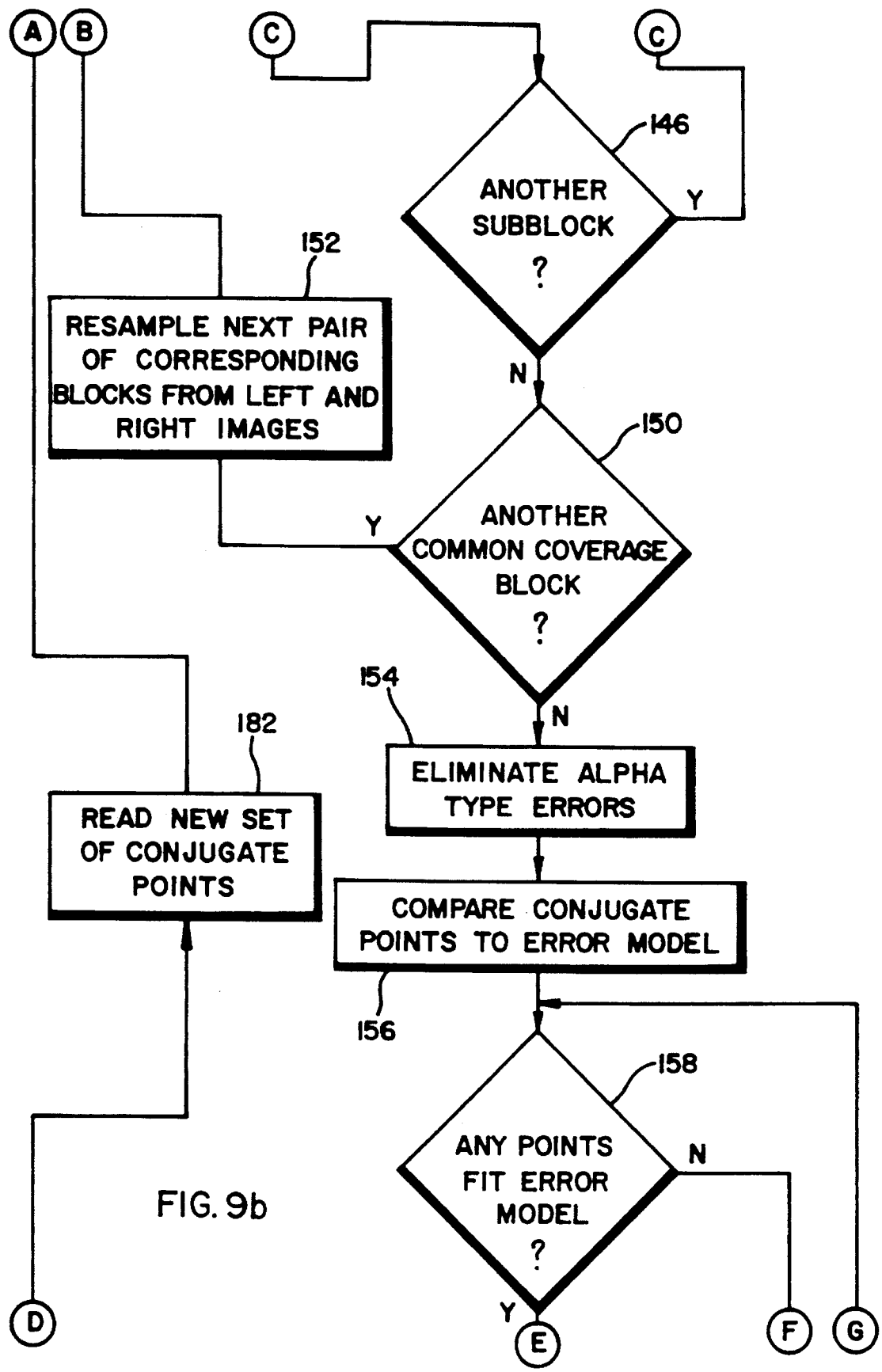
Figure 9C:
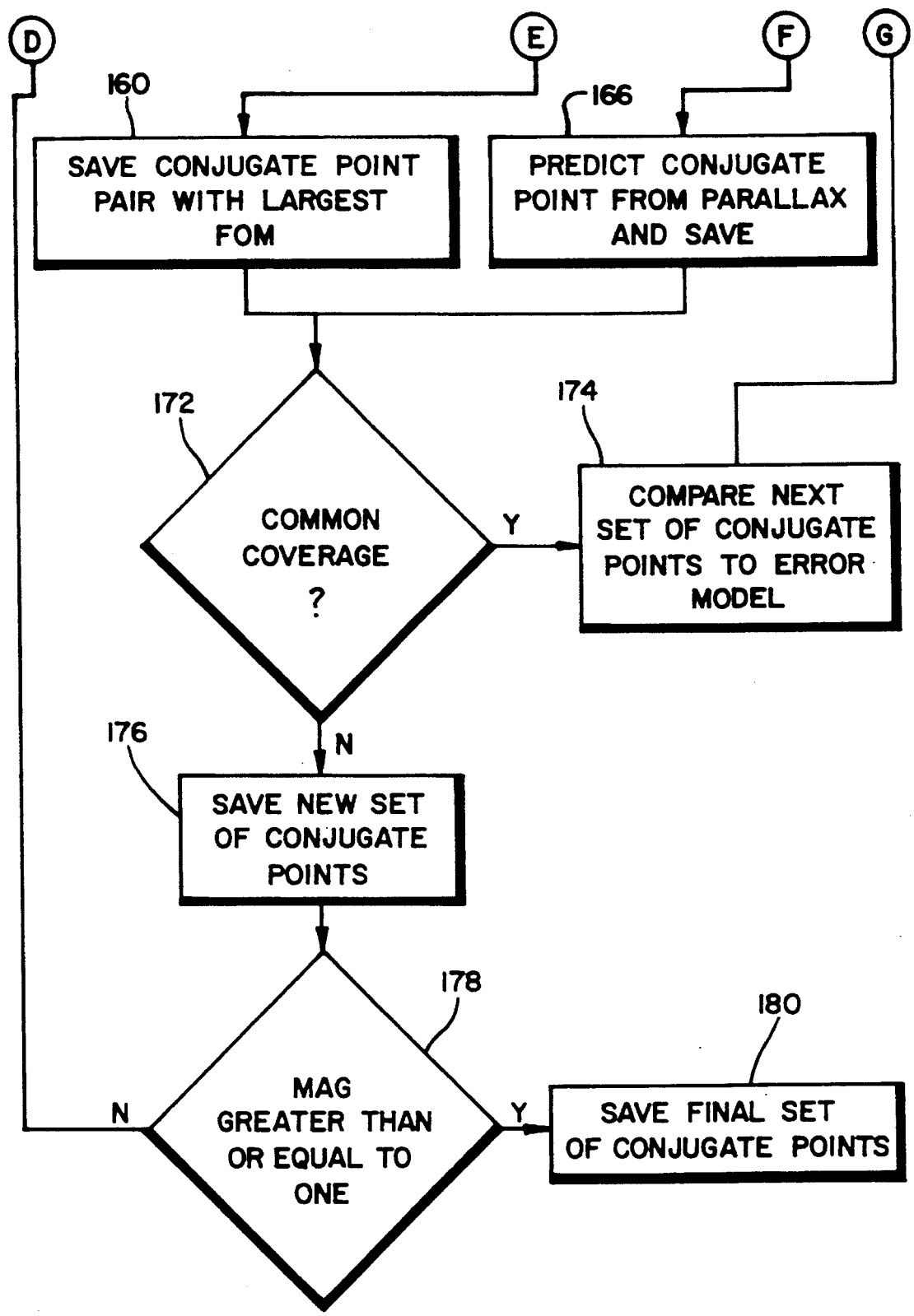

Referring now to FIGS. 9a, 9b and 9c, there is illustrated a flow chart of the process for iteratively refining the initial conjugate point set generated by the process shown in FIGS. 7a and 7b. Initially, the data is read at step 131 from the right and left 512 by 512 data sets. The initial conjugate point set is read at step 133. The magnification for the resampling of the data images is set at step 134 to twice the magnification used in determining the previous conjugate point set. The data from the first common coverage block pair within the 512 by 512 data sets is resampled at step 138 by dewarping blocks twice the size of the common coverage block used to generate the previous group of conjugate points. The resampled blocks have the same centers as the previously generated common coverage blocks but are sampled at twice the magnification of the previous blocks. These expanded blocks have the same ground coverage but twice the resolution of the previously used blocks. These resampled blocks are overlain with an 8 by 8 subblock grid of overlapping 64 by 64 blocks.

The first subblock of the grid in the left image data set is phase correlated at step 140 with the corresponding subblock of the right image data set generating the offset vector (parallax) and FOM of the subblock pair. The offset vector and FOM are saved at step 142. The conjugate points for the subblock pair are calculated and saved at step 144 by calculating the center point coordinates for the left subblock and determining the center point coordinates of the right subblock by adding the offset vector to the center point coordinates of the left subblock.

Inquiry step 146 determines if all subblocks within a common coverage block have been analyzed, and if not, the next subblock pair is phase correlated at step 148 and control returns to step 142. When all subblocks have been phase correlated, control passes to inquiry step 150 to determine if all common coverage block within the 512 by 512 data set have been analyzed. Control returns to step 152 when other common coverage block must be analyzed and the next common coverage block is resampled and overlain with the 8 by 8 grid at step 152. Once all common coverage blocks have been analyzed, all alpha-type errors within the refined conjugate point sets are eliminated at step 154 in the same manner described with respect to FIG. 6.

Next, the conjugate points for each subblock within the first common coverage area block are compared to the error model at step 156. Inquiry step 158 determines if any of the conjugate points satisfy the error model. When one or more conjugate points satisfy the error model, the conjugate point having the maximum Figure-Of-Merit is saved at step 160. If no conjugate points satisfy the error model, a conjugate point is predicted and saved at step 166 by adding the mean parallax of the conjugate point set ($r^u$, $s^u$) to the initial conjugate point estimate for the common coverage blocks as follows:

$$r_l^{conjugate}(i,j) = r_l(i,j)$$

$$s_l^{conjugate}(i,j) = s_l(i,j)$$

$$r_r^{conjugate}(i,j) = r_r(i,j) + r^u$$

$$s_r^{conjugate}(i,j) = s_r(i,j) + s^u$$

Inquiry step 172 determines if all common coverage blocks have been compared to the error model compares at step 174 the next set of conjugate points to the error model if necessary. Otherwise, the modified set of conjugate points is saved at step 176 and the magnification is checked at inquiry step 178 to determine if it presently is greater than or equal to one. If not, the new set of conjugate points is read at step 182 and control returns to step 134 where the magnification is doubled. When inquiry step 178 determines the magnification is greater than or equal to one, the previously generated set of conjugate points is saved at step 180 as the final set of conjugate points.

Figure 10:
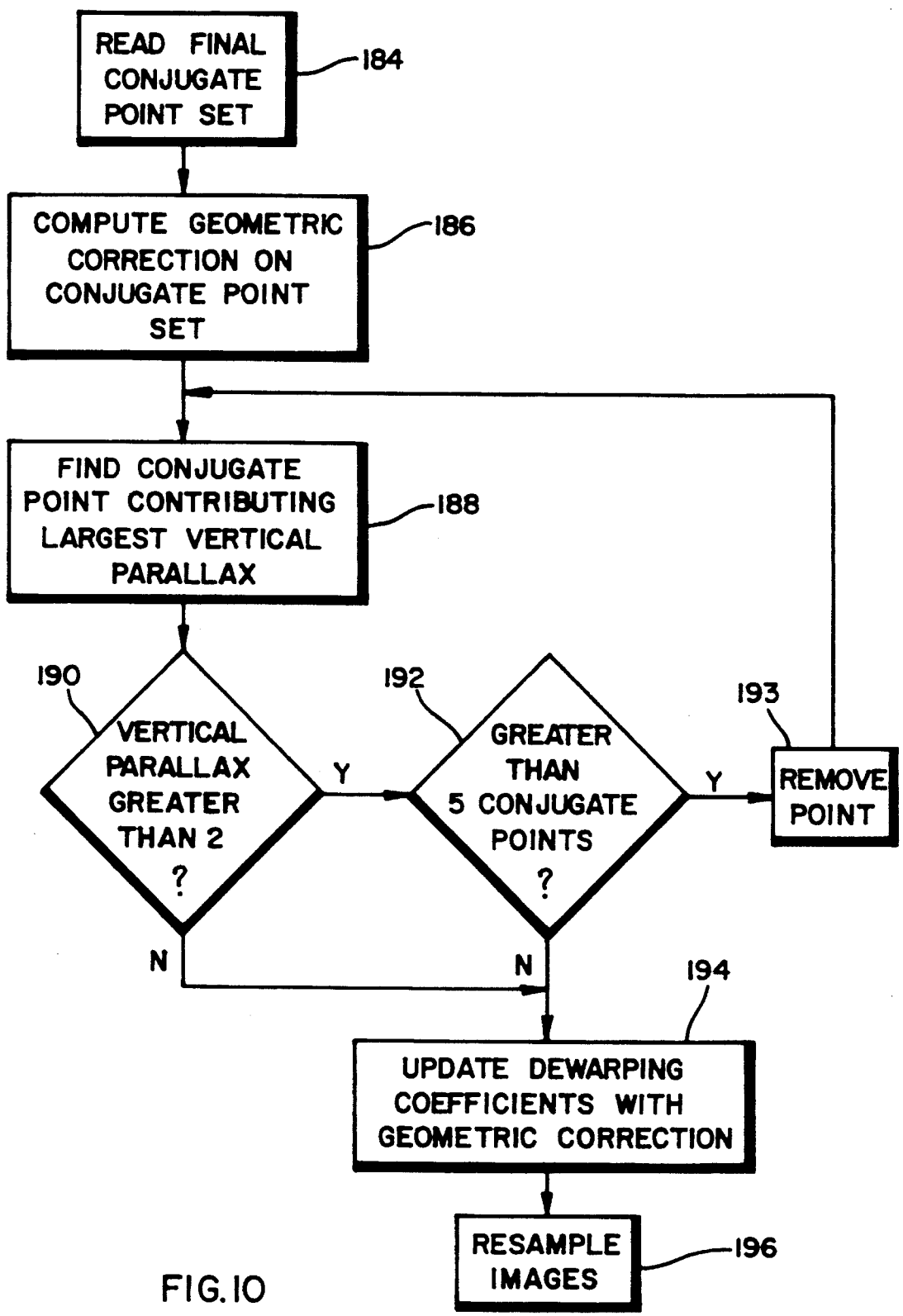
FIG. 10 is a flow diagram illustrating the method for geometric correction of the dewarping coefficients from the final conjugate point set.

Referring now to FIG. 10, there is a flow diagram illustrating the geometric correction of the dewarping coefficients once the final conjugate point set has been generated. First, the final conjugate point set is read at step 184 and the geometric corrections for the conjugate point set are computed at step 186.

The conjugate point contributing the largest vertical parallax is found at step 188. Inquiry step 190 determines if the vertical parallax for the conjugate point set is greater than two (2) pixels. When the vertical parallax is greater than two (2) pixels, inquiry step 192 determines if more than five (5) conjugate points still exists within the conjugate point set and removes, at step 193, the conjugate point contributing the largest vertical parallax if more than five (5) points still exists and then returns to step 188. When only five (5) conjugate points are left or when the maximum vertical parallax is less than two (2) pixels, the dewarping coefficients are updated at step 194 with geometric correction. The left and right data image sets are then resampled at step 196, generating image data sets that are registered, in the stereo sense, with pointing and scan rate errors removed. These resampled image data sets are then utilized to generate a registered image pair for transmission to the display terminal 7 of FIG. 1 as discussed earlier.

Although a preferred embodiment of the invention has been illustrated in the accompanying drawings and described in the foregoing Detailed Description, it will be understood that the invention is not limited to the embodiment disclosed, but is capable of numerous rearrangement and modifications of parts and elements without departing from the spirit of the invention.

We claim:

1. A method for registering multiple autonomously images of a target, the method comprising the steps of:

detecting and recording the target at different geolocations to generate multiple, digitized images of the target;

storing the digital images in a storage area;

generating image registration in a processing unit receiving the digital images from the storage area by the steps of:

(a) dewarping the multiple digitized images into approximate registration using image geolocation information;

(b) generating an identification of areas of common coverage between the approximately registered digitized images;

(c) generating greatly reduced resolution digital images of areas of common coverage between the approximately registered images;

(d) phase correlating the areas of common coverage between the reduced resolution images to identify initial conjugate points;

(e) refining the identified initial conjugate points at increased image resolution to identify final conjugate points in the common coverage area between the approximately registered images; and (f) dewarping the multiple images of the target into registration using the identified final conjugate points; and stereoscopically displaying the registered multiple images at a display terminal.

2. The method as in claim 1 wherein the geolocation information comprises position, altitude and velocity data for each image.

3. The method as in claim 1 wherein the step of dewarping the multiple images into approximate registration comprises the steps of:

scaling the multiple images; and horizontally orienting the scaled multiple images.

4. The method as in claim 1 wherein the step of generating an identification of the areas of common coverage comprises the steps of:

generating reduced resolution images of the approximately registered images;

phase correlating the reduced resolution images to determine a translational offset between the approximately registered images;

aligning the approximately registered images in accordance with the determined translational offset;

boundary tracking along the aligned, approximately registered images; and comparing the images during boundary tracking to locate vertices of the areas of common coverage.

5. The method as in claim 1 wherein the step of refining comprises the steps of:

generating an increase in the magnification of the areas of common coverage;

phase correlating the magnified areas of common coverage to locate refined conjugate points in the areas of common coverage between the approximately registered images;

repeating the step of generating an increase in the magnification and the step of phase correlating to establish a predetermined magnification of the areas of common coverage; and outputting the located refined conjugate points as the final conjugate points.

6. The method as in claim 1 further including the steps of:

identifying registered conjugate points having a vertical parallax exceeding a predetermined minimum;

removing the conjugate points identified as exceeding the predetermined minimum; and outputting remaining registered conjugate points as the final conjugate points.

7. A method for displaying at a display terminal first and second digital images of a target in registration, the images detected and recorded in a storage area, the images autonomously detected at different geolocations, comprising the steps of: generating image registration in a processing unit receiving the digital images from the storage area by the steps of:

(a) converting the first and second digital images into the same scale in accordance with geolocation information for the images;

(b) generating initially dewarped first and second images by rotating the converted first and second images in accordance with the geolocation information to horizontally orient an epipolar line;

(c) comparing the initially dewarped first and second images to identify areas of common coverage between the first and second images;

(d) generating greatly reduced resolution images of the areas of common coverage between the initially dewarped first and second images;

(e) comparing the areas of common coverage between two reduced resolution images to identify initial conjugate points;

(f) generating final conjugate points in the common coverage area between the initially dewarped first and second images by refining the identified initial conjugate points at increased image resolution;

(g) converting the first and second images into the same scale in accordance with the registered final conjugate points; and (h) generating finally dewarped first and second images by rotating the converted first and second images into registration in accordance with the registered final conjugate points to horizontally orient the epipolar line of each image; and stereoscopically displaying the registered, finally dewarped first and second images at the terminal display.

8. The method as in claim 7 wherein the geolocation information comprises position, altitude and velocity data.

9. The method as in claim 7 wherein the step of comparing to identify the areas of common coverage comprises the steps of:

generating reduced resolution images of the initially dewarped images;

phase correlating the two reduced resolution images to determine a translational offset between the two approximately registered images;

aligning the two approximately registered images in accordance with the determined translational offset; and locating vertices of the area of common coverage by comparing boundaries of the aligned images.

10. The method as in claim 7 wherein the step of generating final conjugate points comprises the steps of:

generating an increase in the magnification of the areas of common coverage;

comparing the magnified areas of common coverage to locate refined conjugate points in areas of common coverage between the two approximately registered images;

repeating the step of generating an increase in the magnification and the step of comparing to establish a predetermined magnification of the areas of common coverage; and outputting the located refined conjugate points as the final conjugate points.

11. The method as in claim 10 wherein the step of outputting includes the steps of:

identifying refined conjugate points having a vertical parallax exceeding a predetermined minimum;

removing the refined conjugate points identified as exceeding the predetermined minimum; and outputting remaining refined conjugate points as the final conjugate points.

12. A method for extracting conjugate points from between two autonomous sensor images, comprising the steps of:

(a) dewarping the two sensor images into approximate registration using sensor location information;

(b) generating an identification of areas of common coverage between the approximately registered images;

(c) generating greatly reduced resolution images of areas of common coverage between the approximately registered images;

(d) phase correlating the areas of common coverage between the reduced resolution images to identify initial conjugate points;

(e) adjusting the magnification of the phase correlated reduced resolution images;

(f) comparing the magnification adjusted images to refine the identification of the initial conjugate points;

(g) repeating steps (e) and (f) to establish a predetermined magnification; and (h) outputting the refined initial conjugate points at the predetermined magnification as set of final conjugate points between the two sensor images.

13. The method of claim 12 wherein the step of phase correlating the reduced resolution images comprises the steps of:

overlaying each of the reduced resolution images with a block grid; and phase correlating each block in one image with a corresponding block in the other image to identify the initial conjugate points in each correlated pair of blocks.

14. The method of claim 12 wherein the step of comparing the two magnification adjusted images comprises the steps of:

overlaying the two increased magnification images with a block grid;

overlaying the blocks within the block grid with a sub-block grid; and phase correlating each subblock in one image with a corresponding subblock in another image set to refine the identification of the initial conjugate points.

15. A method performed by a processing unit for registering images pairs having common scenery comprising:

storing in memory of a processing unit image data sets of first and second digital images of a common target taken at different geolocations;

initially sampling the image data sets of the first and second digital images stored in memory of the processing unit elements of at least one of the first and second images into a common coordinate system and scale according to initial dewarping parameters determined in response to sensor geolocation information for each image;

determining areas of common coverage between the initially sampled first and second images;

extracting from the first and second digital images pairs of conjugate points, one point in each pair from each of the first and second images, lying within the area of common coverage from the first and second images, the step of extracting including:

dividing the common coverage area of the initially sampled first and second images into a plurality of image blocks;

phase correlating corresponding image block pairs in the initially registered first and second images for determining average parallax over the entire block and predicting shift between blocks required to match the phases of the blocks; and if a corresponding pair of image blocks phase correlate to within a predetermined degree of confidence, storing in memory of the processing unit the center of each block, shifted according to the predicted shift, as a conjugate pair; and resampling a second time with the processing unit the first and second images according to refined dewarping parameters, the refined dewarping parameters being determined by geometric corrections of the initial dewarping parameters which result in at least a predetermined number of the conjugate pairs registering to within a predetermined minimum error after resampling.

16. The method of claim 15 wherein extracting conjugate pairs further comprises:

subdividing phase-correlated image block in each of the first and second images into image sub-blocks;

phase correlating corresponding image sub-blocks in each image and predicting a shift between image sub-blocks required to match the image sub-blocks; and storing in memory the centers of correlated image sub-blocks, shifted according to the predicted shift, as conjugate pairs.

17. The method of claim 16 including reducing resolution of the initially registered first and second images before dividing the common coverage area into image blocks; and further including increasing the resolution of the correlated image blocks before sub-dividing the image blocks.

18. An apparatus for automatically registering autonomous images pairs having common scenery comprising:

a memory for storing first and second digital images taken at different camera locations containing scenes of common terrain in memory;

means for determining, in response to receiving information describing sensor for each image, preliminary dewarping parameters;

means for initially sampling elements of at least one of the first and second images into a common coordinate system with the other of the first and second images according to the preliminary dewarping parameters;

means for determining areas of common coverage between the initially registered first and second images;

means for dividing the common coverage area of the initially registered first and second images into a plurality of image blocks;

means for phase correlating each image block in corresponding pairs of blocks by phase correlating them and predicting shift between image blocks required to match the image blocks;

means for storing, for each pair of image blocks which correlate, the center of each image block, shifted according to the predicted shift, as a conjugate pair;

means for geometrically correcting the initial dewarping parameters to produce refined dewarping parameters which result in at least a predetermined number of the conjugate pairs registering to within a predetermined minimum error; and means for finally resampling the first and second images using the refined dewarping parameters.

19. The apparatus of claim 18 further comprising:

means for subdividing correlated image blocks into image sub-blocks;

means for phase correlating corresponding image sub-blocks and predicting a shift between image sub-blocks required to match the image blocks; and means for storing in memory the centers of correlated image sub-blocks, shifted according to the predicted shift, as conjugate pairs.

20. The apparatus of claim 19 further comprising:

means for reducing resolution of the initially registered first and second images before dividing them into image blocks; and means for increasing the resolution of the correlated image blocks before sub-dividing the image blocks.

* * * * *